(No Model.)
E. THOMSON.
ELECTRIC METER.
No. 428,649. Patented May 27, 1890.
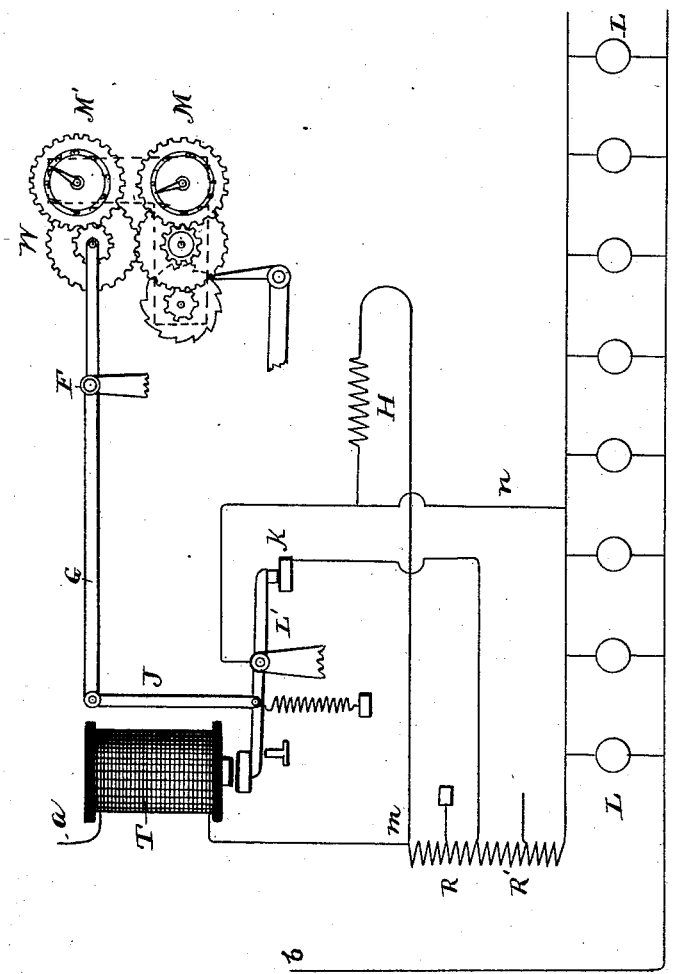
Attest
W. E. Bawen
Wm H. Capel
Inventor:
Elihu Thomson
By Townsend & MacArthur
Att'ys

UNITED STATES PATENT OFFICE.

ELIHU THOMSON, OF LYNN, MASSACHUSETTS.

ELECTRIC METER.

SPECIFICATION forming part of Letters Patent No. 428,649, dated May 27, 1890.

Application filed January 27, 1888. Serial No. 262,188. (No model.)

*To all whom it may concern:*

Be it known that I, ELIHU THOMSON, a citizen of the United States, and a resident of Lynn, in the county of Essex and State of Massachusetts, have invented a certain new and useful Electric Meter, of which the following is a specification.

The object of my invention is to provide an electric meter which will register with delicacy and accuracy for small electric consumption, while also allowing for the metering correctly of large consumption.

My invention consists in constructing the meter apparatus as a compound meter and in employing a part only of the meter apparatus during ordinary consumption, and upon an increase of current beyond the capacity of the part always in circuit to meter or register mechanically connecting an additional part of the meter with the impelling mechanism or part normally driven thereby, so as to properly increase the total register indications. The mechanical connection may be with any part of the register mechanism which is normally in operation or is driven thereby.

In the accompanying drawing, the figure is a diagram illustrating one way of carrying my invention into effect.

Referring to the figure, M M' indicate the two parts of the meter which is designed to measure the current flowing between terminals *a b* of an electric circuit and through a varied number of electric lamps L L or other translating apparatus.

The meter may be fed with the whole or a part of the current to be measured, as desired.

The meter is operated by an impelling mechanism adapted to give motion to a pawl and ratchet geared to the part M of the register, as indicated, and actuated by or responsive to the current flowing through the work, or to a current whose amount is proportionate to that consumed in the work. In the present case the circuit containing the meter is typified by a resistance H, representing the resistance of such meter and placed in a shunt around sections of artificial resistance, (indicated at R R'.)

T indicates an electro-magnet or other device responsive to variations of electric current, which device is connected in or to the electric circuit in proper manner to be affected by the variations in the strength of the current to be measured.

The part M of the meter is normally and constantly in operation.

Connected with or controlled by the magnet T or other electro-responsive device is a lever G, pivoted at F and joined to the lever L', which carries the armature for T by means of a link J. Lever G carries a wheel or clutch W, adapted to gear the part M of the register or mechanism connected therewith or with its actuating appliances to a second register or counting device M', which is out of operation when the armature of magnet T is down, owing to the fact that the wheel W is disconnected from the impelling mechanism of dial M. Electro-magnet T or similar electro-magnet also controls through the lever L' the contacts of a switch, (indicated at K,) which serves to adjust or vary the current flowing in the circuit containing H. This adjustment or variation of current is here effected by means of the resistance R R', which is divided into two or more parts that normally are both in a shunt to the meter, (indicated at H.) An intermediate part of the resistance is connected to contact K, so that when the contact is closed through an increase of the current to be measured a part R' of the resistance will be cut off or shunted, leaving the part R alone in use, and therefore causing current to be diverted from the meter-circuit containing H. When less than a certain current is to be measured, both the resistances R R' are in shunt to the meter, and the registrations are then produced at a certain rate preadjusted or predetermined upon the part of the register mechanism indicated by M. During such operation the part M' of the dial or register mechanism is disconnected from the actuating appliances.

When the current to be metered increases so that the meter could not accurately or properly register said current by its part M, the magnet T, adjusted as before described, closes the shunt around the section R' of the resistances, thereby reducing the current in the meter-circuit H proportionately—say to exactly half what it would have been had section R' not been cut out. Under this condition the register would only indicate half-consumption; but a correct registry is obtained by increasing the meter indications to double by throwing in the section of meter M' mechanically by means of lever G or other attachment to a device responsive to the increase of current to be measured. Any mechanical device suited for this purpose may be employed. The device shown consists simply of a wheel W, gearing with the register M' and brought into gear with a wheel of the register M when the magnet T raises its armature. The sum of the two parts of the register at M M' obviously indicates the consumption.

When magnet T lets go its armature on a decrease below the amount for which it is set to operate and the section of register M' is thrown out of action, the shunt around R' is opened and the electric part of the meter receives the full current. The meter is therefore sensitive to a small load and registers it properly on the section M, while with heavy loads the registry takes place on both parts of the meter M M'; but the current through the meter is only half or a proportionate amount, so that the meter itself is never overloaded.

It is obvious that the arrangement shown in the figure might be extended by further subdividing the resistances so as to proportionately shunt current from the circuit n m on a further increase of current and by further increasing the indicating parts of the register.

It is evident that while I have assumed that the resistances are so proportioned as to cause half of that current which would have passed in H to flow when the contact K is opened, and I have assumed, further, that the gearing connecting the indicators M M' is such as to duplicate the readings when R is alone in circuit, nevertheless other fractional parts of the current might have been selected by properly proportioning the sections of resistances R R' and the resistance H. In this case a corresponding change would be made in the rate at which the section of register M' should move when geared to move with the section M, or the dials of the two registers might be so graduated as to differ correspondingly in their readings. In other words, the invention is not limited to the case of halving the current in a circuit from n to m and doubling the registry; but the same results would be produced by any other suitable proportions. Thus, for instance, if one-third of the current were permitted to flow in the part H at the moment of closure of the shunt at K, the gearing should be such as to cause a total triple registry in the meter M M' when the second part is geared or connected to work with the first.

I do not limit myself to any particular means of bringing into operation the second part M' of the register, nor to any particular means for cutting down the flow of current in the part of the register which is always in circuit upon an increase of the total current to be metered beyond that which can be properly registered or indicated by such latter part.

What I claim as my invention is—

1. A compound electric meter having two parts M M', one of which is constantly in action while the current flows, while the other is combined with clutch or gear mechanism for causing its indications to be added to those of the first upon an increase of the current to a predetermined amount.

2. The combination, with a section M of an electric meter, of a second section M', a clutch controlling the connection of the latter with the impelling mechanism, and a current-responsive device, substantially such as described, for operating upon the clutch and bringing the second section M' into operation simultaneously with the first upon an increase in the current to be metered beyond a predetermined amount.

3. The combination, with an electric-meter circuit, of a device, such as an electro-magnet T, responsive to variations in the current to be metered, and an electric switch K, controlled by said magnet for cutting down the current flow in the part of the meter always in circuit upon an increase in the current to be metered beyond a predetermined amount, a supplemental meter-dial or registering device, and mechanism for connecting the same with the meter-impelling device, as and for the purpose described.

Signed at Lynn, in the county of Essex and State of Massachusetts, this 23d day of January, A. D. 1888.

ELIHU THOMSON.

Witnesses:
OTIS K. STUART,
J. W. GIBBONEY.